(12) United States Patent
Engel et al.

(10) Patent No.: US 6,618,154 B2
(45) Date of Patent: Sep. 9, 2003

(54) OPTICAL MEASUREMENT ARRANGEMENT, IN PARTICULAR FOR LAYER THICKNESS MEASUREMENT

(75) Inventors: Horst Engel, Giessen (DE); Hakon Mikkelsen, Magdala (DE); Lambert Danner, Wetzlar-Naunheim (DE); Matthias Slodowski, Jena (DE); Kuno Backhaus, Zoellnitz (DE); Joachim Wienecke, Jena (DE)

(73) Assignee: Leica Microsystems Jena GmbH, Jena (DE)

( * ) Notice: Subject to any disclaimer, the term of this patent is extended or adjusted under 35 U.S.C. 154(b) by 0 days.

(21) Appl. No.: 09/846,331

(22) Filed: May 2, 2001

(65) Prior Publication Data

US 2002/0003217 A1 Jan. 10, 2002

(30) Foreign Application Priority Data

May 2, 2000 (DE) .......................... 100 21 379

(51) Int. Cl.$^7$ ............................... G01B 9/02
(52) U.S. Cl. ........................ 356/503; 356/369
(58) Field of Search ................. 356/503, 369

(56) References Cited

U.S. PATENT DOCUMENTS

| | | | | |
|---|---|---|---|---|
| 5,129,724 A | * | 7/1992 | Brophy et al. | 356/503 |
| 5,212,588 A | | 5/1993 | Viswanathan et al. | |
| 5,486,701 A | | 1/1996 | Norton et al. | 250/372 |
| 6,025,916 A | | 2/2000 | Quick et al. | |
| 6,108,087 A | * | 8/2000 | Nikoonahad et al. | 356/503 |

FOREIGN PATENT DOCUMENTS

| | | |
|---|---|---|
| DE | 195 22 188 A1 | 1/1997 |
| EP | 09 152 375 | 6/1997 |
| EP | 0 922 980 A2 | 6/1999 |

\* cited by examiner

Primary Examiner—Stephone Allen
(74) Attorney, Agent, or Firm—Foley & Lardner (57) ABSTRACT

The invention refers to an optical measurement arrangement, in particular for layer thickness measurement and for ascertaining optical material properties such as refractive index, extinction factor, etc. of a specimen (P), having an illumination device (1) for emitting a measurement light beam (6), a beam splitter (8) for dividing the measurement light beam (6) into a specimen light beam (10) and a reference light beam (9), a measurement objective for directing the specimen light beam (10) onto a measurement location (M) on the surface of the specimen (P) and for acquiring the light reflected from the measurement location (M), and an analysis device (11) into which the reference light beam (9) and the specimen light beam (10) reflected from the specimen (P) are coupled in order to obtain information about the specimen (P), in particular about layer thicknesses present thereon. Light-guiding devices (23, 25) having a plurality of light-guiding fibers are provided for coupling the specimen light beam (10) and the reference light beam (9) into the analysis device (11). The result is to create a compact optical measurement arrangement that can be flexibly set up and is insensitive to disturbance, which is suitable in particular for automatic monitoring of continuous production processes, in particular in semiconductor chip manufacture.

10 Claims, 4 Drawing Sheets

OPTICAL MEASUREMENT ARRANGEMENT, IN PARTICULAR FOR LAYER THICKNESS MEASUREMENT

CROSS REFERENCE TO RELATED APPLICATIONS

This invention claims priority of a German patent application DE 100 21 379.0 which is incorporated by reference herein.

FIELD OF THE INVENTION

The invention concerns an optical measurement arrangement, in particular for layer thickness measurement and for ascertaining optical material properties of a specimen, comprising an illumination device for emitting a measurement light beam, a beam splitter for dividing the measurement light beam into a specimen light beam and a reference light beam, a measurement objective for directing the specimen light beam onto a measurement location on the surface of the specimen and for acquiring the light reflected from the measurement location, and an analysis device into which the reference light beam and the specimen light beam reflected from the specimen are coupled in order to obtain information about the specimen, in particular about layer thicknesses present thereon.

BACKGROUND OF THE INVENTION

Optical measurement arrangements that operate on the principle of spectrophotometry, and their particular use for layer thickness measurement, are known in many varieties from the existing art. They have been utilized with particular success in the measurement of thin layers and optical parameters (such as refractive index n and extinction coefficient k) of single-layer and multilayer systems on patterned wafers.

Since increasingly fine patterns and thinner layers are desirable in particular in wafer manufacture, requirements are also increasing in terms of the accuracy of the optical measurement arrangements with which the dimensional consistency of the patterns and layers can be verified. In the context of this development, there is an interest in performing measurements both on single-layer systems and on multilayer systems. In addition, it should be possible to make exact measurements, with the same optical measurement arrangement, of thin layers having thicknesses of approximately 1 nm and above and of thicker layers up to approximately 50 $\mu$m.

In addition to the demand for increased accuracy, the desire for greater production volumes must also be taken in account. In the continuous production of wafers, for example, it is necessary to measure them at shorter and shorter time intervals, and whenever possible in-line. On the other hand, space considerations must be also be borne in mind when integrating an optical measurement arrangement into a continuous production line. The arrangement should require little space, and should be flexible in terms of setup. Also desirable is suitability for rapid adaptation to changes in physical conditions. In this context, however, accuracy considerations must never be forgotten.

An optical measurement arrangement of the kind cited initially is known, for example, from U.S. Pat. No. 5,486,701. This is based on the principle of spectral analysis of the light reflected from a measurement location, each thickness having associated with it a characteristic interference-dependent reflection spectrum. The optical measurement arrangement disclosed in U.S. Pat. No. 5,486,701 is, however, specialized for the measurement of extremely thin layers. For that purpose, a separate analysis is made of the UV region and the visible region of the reflected light, so as to obtain therefrom the actual information concerning the measurement location on the specimen. Because of the large number of optical assemblies incorporated into the beam path, the assemblage is complex and sensitive to external influences. The optical deflection devices which transfer a measurement light beam emitted from the illumination device to the specimen and on to the analysis device further limit the design possibilities with regard to a compact assemblage.

The lateral resolution capability for patterns on the specimen depends on the wavelength of the measurement light used. Shorter-wavelength light allows finer patterns to be resolved. In connection with the measurement of very thin layers (in the range of less than one-tenth the wavelength of the measurement light), a further consideration is that the brightness differences that are to be analyzed, from which the information about layer thickness is obtained, become very small. With thin layers in particular, it is important to transfer the light reflected from the specimen to an analysis device with as little loss or interference as possible.

SUMMARY OF THE INVENTION

Against this background, it is the object of the invention to create an optical measurement arrangement that, with a simple and compact configuration, allows accurate information to be obtained concerning properties of a specimen being examined, in particular a patterned wafer.

This object is achieved with an optical measurement arrangement of the kind cited initially in which light-guiding devices having a plurality of light-guiding fibers are provided for coupling the specimen light beam and the reference light beam into the analysis device.

The arrangement at this concrete location of the light-guiding devices, known per se in the field of optical applications, makes possible a good compromise between minimally distorted transfer of the measurement light—i.e. of a component uninfluenced by the specimen (namely a reference light beam) and a component influenced by the specimen (namely a specimen light beam)—and a particularly compact and at the same time flexible configuration of the optical measurement arrangement, which as a result is particularly suitable for being set up in continuous production lines.

Use of the light-guiding devices directly at the entrance of the analysis device allows the latter to be arranged flexibly with respect to the measurement objective. The arrangement is moreover insensitive to interfering influences from the production process, for example vibration.

Preferably a separate light-guiding device is used in each case for the specimen light beam and for the reference light beam, so that beam guidance is mutually independent and thus can be accomplished with as little restriction as possible in accordance with the particular physical conditions that are present.

In a further advantageous embodiment, the exit ends of the light-guiding fibers at the entrance of the analysis device are arranged in correspondence with a receiver provided on the analysis device. Optimum yield of the light reflected from the specimen is thereby obtained. In consideration of analysis devices that are common on the market, for example spectrographs with a downstream CCD detector, the exit ends of the light-guiding fibers are preferably arranged in linear fashion.

To achieve the clearest possible differentiation between maxima and minima in the spectrum of the specimen light beam reflected from the specimen, in a further advantageous embodiment of the invention an aperture stop is arranged in the measurement light beam in front of the beam splitter. The aperture stop preferably has a passthrough opening in the shape of a quarter-circle ring, hereinafter also called a "quarter pupil." This allows the incident and return light to be guided separately to the measurement objective, and additionally permits the light of a focusing device to be coupled into the measurement objective in order to align the specimen relative to the measurement objective.

For optimum utilization of the light in the aperture, the entrance ends of the light-guiding fibers for the specimen light beam and the reference light beam can be distributed over a surface on which the shape of the opening of the aperture stop is reproduced. The enveloping curve of the light-guiding fibers corresponds substantially to the contour of the opening of the aperture stop. This advantageously also ensures that complete illumination of the entrance ends of the light-guiding devices remains independent of the size of a measurement window on the specimen, and of the settings of the field stop and the pinhole mirror.

It is preferable to use light-guiding devices in which the positional allocation between the entrance ends and exit ends of the individual light fibers is random. For particular measurement tasks, however, it may be advantageous if identical regions of the reference light beam and the specimen light beam can be compared to one another. For that purpose, for example, the positional relationship between the entrance ends and exit ends for each light-guiding device can be determined experimentally, and that positional relationship can be taken into account in the analysis of the signals received in the analysis device. It is also conceivable to arrange the entrance ends and exit ends of the light-guiding fibers for both light-guiding devices in the same positional relationship to one another.

It is at times of interest also to observe the wider surroundings of the measurement location, itself very small, on the specimen. In principle, this can be accomplished to a certain extent by exchanging the measurement objective, but this increases the outlay in terms of equipment for the actual measurement arrangement. The switchover devices which are then required can also degrade the quality of the specimen light beam. In an advantageous embodiment of the invention, therefore, a further objective is provided into which light of the illumination device can be switched for application onto an observation location on the specimen, the measurement light being coupled into the further objective by way of a transfer device separate from the measurement light beam. The almost complete separation, in terms of systems and equipment, between observation of the surroundings of the measurement location and observation of the actual measurement location makes possible a modular construction, so that the further objective with the associated transfer device can be configured as an optionally usable module. On the other hand, because the light used is that of the illumination device which is in any case always present on the optical measurement arrangement, the additional equipment outlay for this module is small. The further objective can of course also be used for additional examinations of the specimen.

The light captured by the further objective can preferably be coupled into a visual display device. With this, for example, the measurement operation can be observed online. It is also possible additionally to record the visually obtained information.

For the measurement of particularly thin layers, it is of interest to use a measurement light with the shortest possible wavelength, i.e. in the deep UV region. For spectrophotometry in this context, a perpendicular incidence of the illumination onto the measurement location of the specimen would be advantageous, since polarization effects could then be avoided. Such a situation, i.e. a very small numerical aperture, would yield a spectrum in which there would be no mixing of reflected light spectra of the light that had been applied at different angles of incidence onto the measurement location. A very small aperture means on the other hand, however, that only a very small quantity of light is available for measurement purposes.

Against this background, it has proven advantageous to use as the measurement objective a mirror objective having a numerical aperture of less than 0.3, and furthermore to use an illumination device that comprises a halogen lamp and a deuterium lamp. Under these conditions, interference spectra with sufficient intensity differences between the minima and maxima can be obtained even with very thin structures. Spectral imaging aberrations are greatly limited by the elimination of glass optical elements.

BRIEF DESCRIPTION OF THE DRAWINGS

The invention will be explained in more detail below with reference to an exemplary embodiment depicted in the drawings, in which.

DETAILED DESCRIPTION OF THE INVENTION

Figure 1:
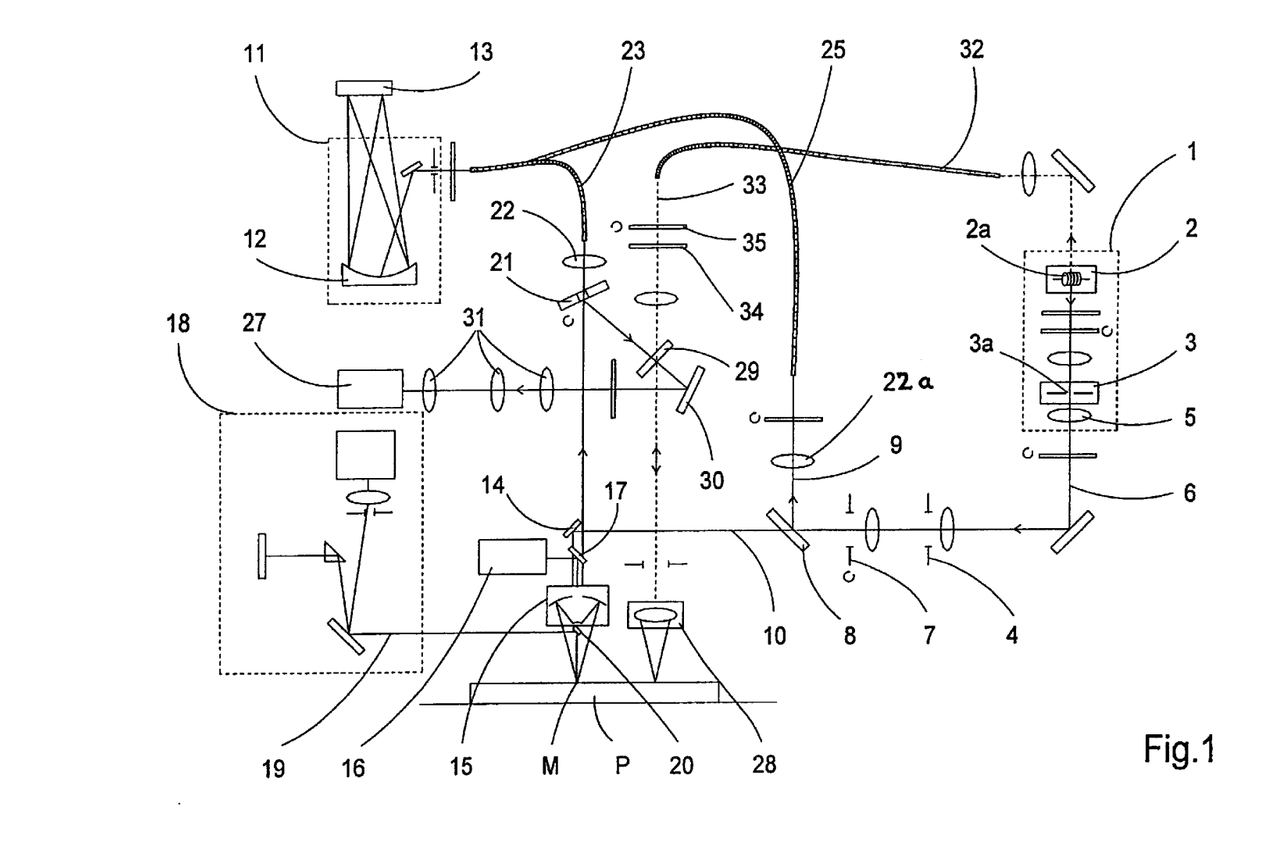
FIG. 1 shows an exemplary embodiment of an optical measurement arrangement which is used here for layer thickness measurement.

The exemplary embodiment shows an optical measurement arrangement for layer thickness measurement according to the principle of spectrophotometry which can be arranged, for example, in a production line for wafer manufacture in order to inspect the surfaces of the wafers. It is suitable in particular for the measurement of thin, partially transparent layers, but can also be used for thicker layers. Optical parameters of single-layer and multilayer systems can also be determined.

The measurement arrangement comprises firstly an illumination device 1 in which the measurement light required for the measurement is generated. Illumination device 1 comprises a halogen lamp 2 that, for high light output, is preferably filled with xenon. A deuterium lamp 3, which serves as a UV-VIS light source, is additionally arranged between halogen lamp 2 and the exit of the measurement light from illumination device 1. To prevent large fluctuations in light intensity, deuterium lamp 3 has an internal deep-UV (DUV) filter which filters out light below a wavelength of 190 nm in order to prevent the creation of ozone. Lamps which do not have such a filter are unsuitable for investigations at short wavelengths, since light absorption by ozone in the light path at a wavelength of approximately λ=250 nm causes intensity fluctuations that are perceptible as unsteadiness of the lamp.

Figure 4:
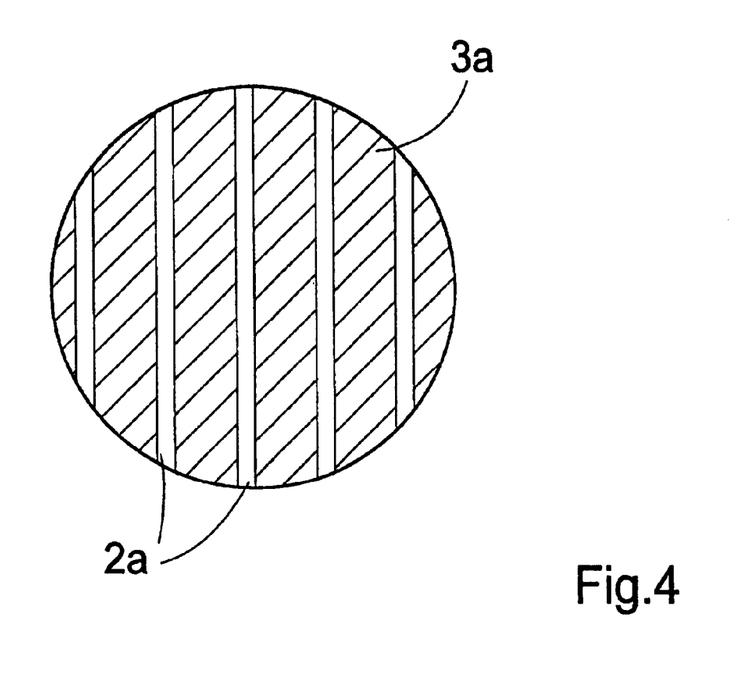
FIG. 4 shows a detail of an illumination device with the illustration of a viewing opening of a deuterium lamp with the filament of a halogen lamp.

In the exemplary embodiment depicted, deuterium lamp 3 possesses a viewing opening 3a that is depicted in FIG. 4. This viewing opening 3a, as well as the front side of a filament 2a of halogen lamp 2, are sharply imaged in the plane of an aperture stop 4 that will be explained in further detail below. For that purpose, a suitable lens arrangement 5 for collimation of a measurement light beam 6 is placed after deuterium lamp 3 in the direction in which light emerges from illumination device 1.

When a conventional deuterium lamp (not depicted in the drawings) without a viewing opening 3a is used, a hinged mirror is additionally provided, with which light can be directed to aperture stop 4 alternatingly from the deuterium lamp or from the halogen lamp.

The combined use of a deuterium lamp 3 with viewing opening 3a together with a halogen lamp 2, on the other hand, means that a measurement light beam in a wavelength region from 190 nm to 800 nm can be made continuously available, so that a particularly simple arrangement can thus be achieved here. In contrast to a hinged-mirror arrangement with which the light either of the deuterium lamp or of the halogen lamp can be alternatingly switched in, the exemplary embodiment depicted here eliminates the operation of switching over the hinged mirror, thus promoting a higher specimen throughput through the measurement arrangement.

In principle, however, it is also possible to direct light from both sources onto aperture stop 4 via suitable stationary mirror arrangements.

Figure 2:
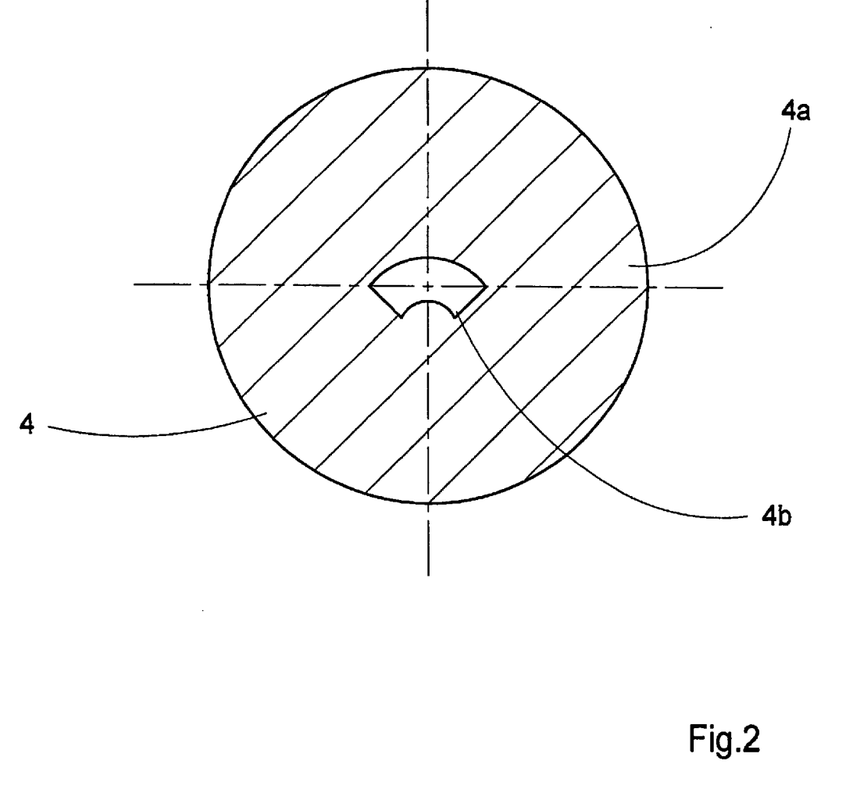
FIG. 2 shows a detail view of an aperture stop that, in the optical measurement arrangement shown in FIG. 1, is arranged in front of a beam splitter for dividing a measurement light beam.
Figure 5:
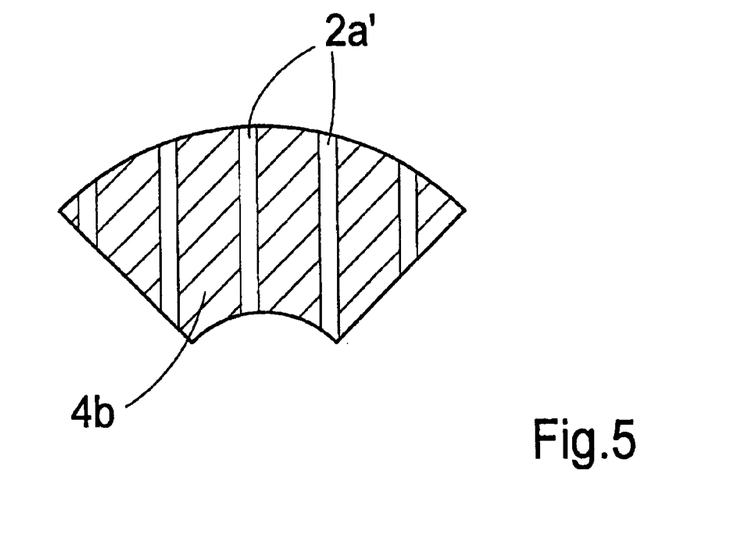
FIG. 5 shows the image of the filament of the halogen lamp in the opening of the aperture stop.

Aperture stop 4, already mentioned, is depicted in detail in FIG. 2. It is constituted by an opaque metal foil 4a in which a transparent, glass-free aperture opening 4b is centrally configured. In the exemplary embodiment depicted, aperture opening 4b has the shape of a quarter of a circular ring, and thus corresponds to a quarter-pupil opening of a mirror objective 15 explained below in more detail. FIG. 5 shows the sharp image 2a' of filament 2a of halogen lamp 2 in opening 4b of aperture stop 4. This is achieved by way of a quartz collector. A further quartz lens in front of aperture stop 4 images the back side of the quartz collector, at a 1:1 ratio, into a field stop 7 placed after aperture stop 4.

The portion of measurement light beam 6 penetrating through aperture stop 4 passes through a field stop 7 and then strikes a beam splitter 8 in the form of a semitransparent deflection mirror. Beam splitter 8 splits measurement light beam 6 into a reference light beam 9 and a specimen light beam 10. The former is conveyed directly to an analysis device 11, whereas specimen light beam 10 is directed first onto a measurement location M on the surface of a specimen P. Specimen light beam 10 reflected from measurement location M is then also conveyed to analysis device 11. In this context, the return reflection from beam splitter 8 does not enter the reference light beam path.

Analysis device 11 comprises a spectrograph 12 whose spectrum is directed onto the receiving matrix of a CCD detector 13.

As is evident from FIG. 1, specimen light beam 10 is switched via a half-mirror into the entrance pupil of a mirror objective 15. For that purpose, a quartz lens placed before field stop 7 images aperture stop 4, at a 1:1 ratio, into the entrance pupil of mirror objective 15. Because the quartz lens is arranged in the vicinity of stops 4 and 7, chromatic aberration remains low.

Specimen light beam 10 is directed by mirror objective 15 largely perpendicularly onto measurement location M. Mirror objective 15 is configured with a numerical aperture of less than 0.3. For example, a mirror objective with 15× magnification and a numerical aperture of 0.28 is used here.

For high measurement accuracy, it is necessary for specimen light beam 10 not to be degraded by edges or struts as it travels to measurement location M. On the other hand, a centrally arranged secondary mirror provided in mirror objective 15 must be attached to a housing segment of mirror objective 15. This is preferably accomplished by way of strut-like retainers not depicted in detail in the drawings (a total of four struts being provided in the present case), which each extend between a primary mirror and the secondary mirror of mirror objective 15. Opening 4b of aperture stop 4 is selected and arranged in such a way that specimen light beam 10 passes through between two adjacent struts of mirror objective 15 without being influenced. If the number of struts is different, the shape of opening 4b of aperture stop 4 must be correspondingly adapted so as to prevent any impairment of specimen light beam 10. Because of the quarter-pupil division in mirror objective 15, a total of only two quarter-pupils are needed for spectrometer 12, awhile the remaining two quarter-pupils can be used in other ways, as will be explained below.

As a further prerequisite for high measurement accuracy, a precise focal position for measurement location M must be ensured. For that purpose, the measurement arrangement is equipped with a focus measurement system 16 which is, for example, a laser autofocus system based on a principle of the existing art. In this, as indicated in FIG. 1, the light of a laser diode, in the form of a focus measurement beam, is directed by a mirror 17 through mirror objective 15 onto specimen P, the remaining two quarter-pupils being used for this purpose. Focus measurement system 16 is coupled in via a butterfly mirror in the shape of a double quarter-pupil, so that the light of the focus measurement beam falls obliquely onto the specimen surface. A light spot that is symmetrical with respect to the optical axis of mirror objective 15 is created only if the specimen surface lies in the focal plane. If the specimen surface is displaced in the direction of the optical axis, i.e. if the specimen surface lies outside the focal plane, the light spot is displaced laterally with respect to the optical axis. This results in generation of a measurement signal proportional to the deviation out of the focal plane, which can be used by way of a connected positioning system to adjust the focal position.

In order to correct leveling, i.e. to compensate for angular deviations on the order of one minute of arc between the line normal to the specimen surface at measurement location M and the optical axis of mirror objective 15, a leveling arrangement 18 whose direction monitoring beam 19 is directed onto the specimen surface at measurement location M is also provided. Direction monitoring beam M is placed onto measurement location M by way of a deflection mirror 20 arranged in the shadow of the secondary mirror of mirror objective 15. This prevents any impairment of specimen light beam 10 by leveling arrangement 18.

The reflected specimen light beam emerging from the back side of mirror objective 15, having passed through a pinhole mirror 21 and a converging lens 22, reaches the entrance of a light-guiding device 23.

Pinhole mirror 21 is of semitransparent configuration, allowing it to divert a portion of specimen light beam 10 coming out of mirror objective 15 for further examination or observation purposes.

Figure 3:
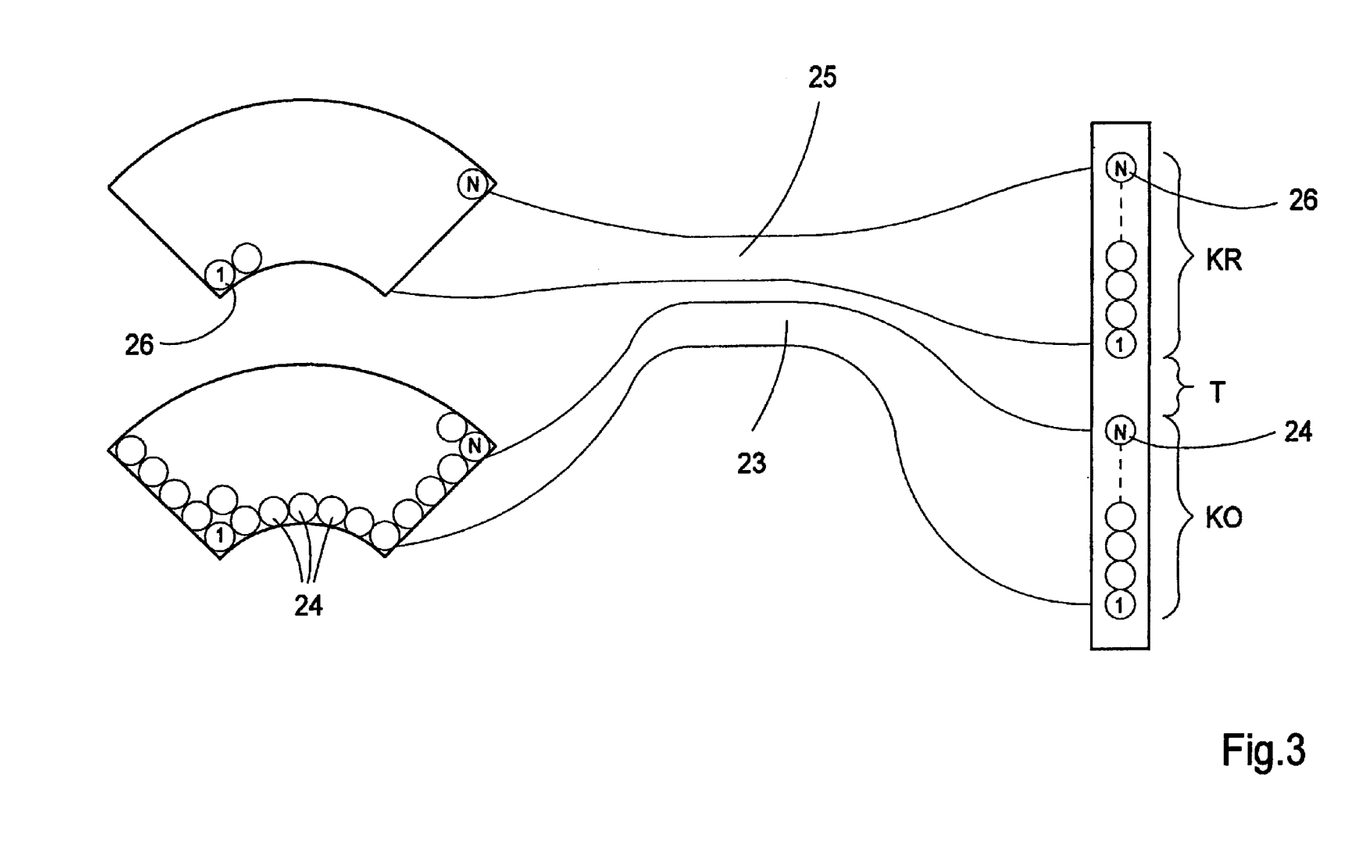
FIG. 3 shows a schematic depiction of light-guiding devices used in the optical measurement arrangement shown in FIG. 1.

The remaining portion of the reflected specimen light beam 10, having the shape defined by aperture stop 4, is imaged by converging lens 22 onto the entrance of light-guiding device 23, the entrance of light-guiding device 23 being completely illuminated. As depicted in FIG. 3, light-guiding device 23 comprises a bundle of individual light-guiding fibers 24 which proceed in bundled fashion to analysis device 11, and there are coupled at their exit ends into analysis device 11 for spectrographic examination.

A separate light-guiding device 25 having a plurality of light-guiding fibers 26, which receives reference light beam 9 after beam splitter 8 and transfers it to the entrance of analysis device 11, is provided for reference light beam 9. The two light-guiding devices 23 and 25 preferably have the same number N of light-guiding fibers 24, 26. For complete illumination of the entrance ends of light-guiding fibers 26 by reference light beam 9, they again have a suitable converging lens 22a placed in front of them. Converging lenses 22 and 22a are made of a UV-transparent quartz glass, for example Suprasil.

Because the aperture is imaged onto the entrance ends of light-guiding devices 23 and 25, illumination of the light-guiding devices is independent of the size of a measurement window on the specimen. For maximum utilization of the light in the aperture, the entrances of light-guiding devices 23 and 25 are adapted to the shape of opening 4b of aperture stop 4, as is immediately apparent from a comparison of FIG. 2 and FIG. 3. The exits of light-guiding devices 23 and 25, which are coupled to the entrance of analysis device 11, are adapted in terms of their shape to a receiver of spectrograph 12.

Light-guiding devices 23 and 25 having entrance ends in the shape of the aperture stop opening are produced by way of a sheet-metal stop having a corresponding opening. The latter is extended grazingly over a larger fiber bundle, so that only the fibers of interest remain in the opening region.

In a first variant embodiment, bundles of light-guiding fibers 24 and 26 whose entrance and exit ends have an arbitrary positional relationship to one another are used for light-guiding devices 23 and 25, respectively. This generally allows for sufficiently accurate analysis. In order to meet more stringent requirements in terms of analysis of the light being transferred, it is possible to ascertain the positions of light-guiding fibers 24 and 26 at the entrance and exit ends of light-guiding devices 23 and 25 respectively; to program analysis device 11 accordingly on the basis of that knowledge; and thereby to take into account in the analysis the origin, in terms of location in the light source or in the respective quarter-pupil, of the information transferred in light-guiding fibers 24 and 26. An unequivocal correlation thus exists between an individual light-guiding fiber and a specific portion of the surface of the quarter-pupil shape.

In a second related variant embodiment, on the other hand, provision can be made for assigning defined positions to the individual light-guiding fibers 24 and 26 at the entrance and exit ends of light-guiding devices 23 and 25, respectively. In this context, the quarter-pupil shape is imaged at the entrance of light-guiding device 23 onto the entrance ends, arranged in field fashion, of light-guiding fibers 24. As with the first variant embodiment, here again an unequivocal correlation is therefore achieved between an individual light-guiding fiber and a specific portion of the surface of the quarter-pupil shape. The individual light-guiding fibers 24 can be arranged to correspond with a continuously rising or continuously falling angle of incidence on the specimen, or in the order in which they are arranged within the quarter-pupil shape. This would offer the advantage that intensity fluctuations among adjacent light-guiding fibers 24 of a light-guiding device 23 remain low, thereby minimizing crosstalk effects between the adjacent light-guiding fibers.

With an eye toward the use of a CCD detector 13 in analysis device 11, the exit ends of the individual light-guiding fibers 24 are spread out in a linear shape at the entrance of analysis device 11 in the interest of spectral resolution.

As is further evident from FIG. 3, light-guiding fibers 24, 26 are combined each into a channel KO, KR, respectively, the arrangement protocol for the individual light-guiding fibers 24, 26 in the two channels being dependent on selection of the first or the second of the variant embodiments described above. The light-guiding fibers of the (in this case different) channels corresponding to identical angles of incidence can also, for example, be combined into groups.

For differentiation between the two channels KO and KR, a separation distance T is provided between them in each case. The individual channels are each spaced apart from one another by a separating distance T of, for example, 0.4 to 1 mm, the total length of channels KO and KR lined up one behind another being in this case approximately 4 mm.

The light obtained at the exit ends of light-guiding fibers 24 and 26 is transferred via spectrograph 12 to CCD detector 13 of analysis device 11. In the exemplary embodiment depicted here, an imaging mirror-grating spectrograph together with a two-dimensional CCD detector is used. This CCD detector 13 is sensitive in the wavelength region from 190 nm to 800 nm. The use of a UV-sensitive, cooled CCD detector having a low dark current, illuminated from the back side, makes possible a rapid readout (within one second) of the measurement spectra.

To monitor the measurement operation, the light diverted by pinhole mirror 21 can be coupled via a lens group 31 into a visual display device 27. This is, for example, a color CCD video camera which serves to display on a monitor the area of the specimen surface being examined, for example in order to allow visual selection of a portion to be inspected, or to observe the measurement process. The image signal that is obtained can furthermore be recorded for the purpose of additional process monitoring.

To obtain a larger image field with more brilliant contrast, an objective 28 (an "overview" objective, so to speak) can be directed onto specimen P. The viewing beam of this additional objective 28 is preferably coupled, via a semi-transparent mirror 29 and a further deflection mirror 30, into lens group 31 and then into visual display device 27. The location on specimen P to be observed by objective 28 is illuminated by way of illumination device 1 which is in any case present. A transfer device completely separate from measurement light beam 6 is, however, provided for this purpose. In the interest of a flexible arrangement, the transfer device comprises a flexible light-guiding device 32 having a plurality of light-guiding fibers. To improve image quality, suitable filters 34 known per se to those skilled in the art, for example a yellow filter, can be inserted into beam path 33 which illuminates the observation location. Also provided in the illuminating beam path is a shutter stop 35 with which the illumination for objective 28 can be switched on and off.

Part List

1 Illumination device
2 Halogen lamp
2a Filament
3 Deuterium lamp
3a Viewing opening
4 Aperture stop
4a Metal foil
4b Opening of aperture stop
5 Lens arrangement
6 Measurement light beam
7 Field stop
8 Beam splitter
9 Reference light beam
10 Specimen light beam
11 Analysis device
12 Spectrograph
13 CCD detector
15 Mirror objective
16 Focus measurement system
17 Mirror
18 Leveling arrangement
19 Direction monitoring beam
20 Deflection mirror
21 Pinhole mirror
22, 22a Converging lens
23, 25 Light-guiding device
24, 26 Light-guiding fiber
27 Visual display device
28 Overview objective
29 Semitransparent mirror
30 Deflection mirror
31 Lens group
32 Light-guiding device
33 Beam path
34 Filter
35 Shutter stop
P Specimen
M Measurement location

What is claimed is:

1. An optical measurement arrangement, for layer thickness measurement and for ascertaining optical material properties of a specimen, comprising an illumination device for emitting a measurement light beam;

a beam splitter for dividing the measurement light beam into a specimen light beam and a reference light beam;

a measurement objective for directing the specimen light beam onto a measurement location on the surface of the specimen and for acquiring the light reflected from the measurement location;

an analysis device into which the reference light beam and the specimen light beam reflected from the specimen are coupled in order to obtain information about the specimen, about layer thicknesses present thereon; and light-guiding devices having a plurality N of light-guiding fibers provided for coupling the specimen light beam and the reference light beam into the analysis device.

2. The optical measurement arrangement as defined in claim 1, wherein a separate light-guiding device is used in each case for the specimen light beam and for the reference light beam.

3. The optical measurement arrangement as defined in claim 1, wherein the exit ends of the light-guiding fibers at the entrance of the analysis device are arranged in correspondence with a receiver provided on the analysis device, in linear fashion.

4. The optical measurement arrangement as defined in claim 1, wherein an aperture stop is arranged in the measurement light beam in front of the beam splitter.

5. The optical measurement arrangement as defined in claim 4, wherein the aperture stop has a passthrough opening in the shape of a quarter-circle ring.

6. The optical measurement arrangement as defined in claim 4, wherein the entrance ends of the light-guiding fibers for the specimen light beam and the reference light beam are distributed over a surface on which the shape of the opening of the aperture stop is reproduced.

7. The optical measurement arrangement as defined in claim 2, wherein the entrance ends and exit ends of the light-guiding fibers for both light-guiding devices are arranged in the same positional relationship to one another.

8. The optical measurement arrangement as defined in claim 1, wherein a further objective, into which light of the illumination device can be switched, is directed onto an observation location on the specimen, the light being coupled into the further objective by way of a transfer device separate from the measurement light beam.

9. The optical measurement arrangement as defined in claim 8, wherein light from the observation location captured by the further objective can be coupled into a visual display device.

10. The optical measurement arrangement as defined in claim 1, wherein the measurement objective is a mirror objective having a numerical aperture of less than 0.3; and that the illumination device comprises a halogen lamp and a deuterium lamp.

* * * * *

UNITED STATES PATENT AND TRADEMARK OFFICE
CERTIFICATE OF CORRECTION

PATENT NO. : 6,618,154 B2
DATED : September 9, 2003
INVENTOR(S) : Horst Engel et al.

It is certified that error appears in the above-identified patent and that said Letters Patent is hereby corrected as shown below:

<u>Title page,</u>
Item [*] Notice, please correct to read as follows:

-- The term of this patent is extended or adjusted under 35 U.S.C. 154(b) by 107 days. --

Signed and Sealed this

Thirteenth Day of April, 2004

JON W. DUDAS
*Acting Director of the United States Patent and Trademark Office*